US011606042B1

(12) United States Patent
Mondal et al.

(10) Patent No.: US 11,606,042 B1
(45) Date of Patent: Mar. 14, 2023

(54) EFFICIENT NEGATIVE-SENSE DETECTION OF SYNCHRONOUS RECITIFER IN VOLTAGE CONVERTER

(71) Applicant: Cypress Semiconductor Corporation, San Jose, CA (US)

(72) Inventors: Partha Mondal, Paschim Medinipur (IN); Rajesh Karri, Visakhapatnam (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/576,706

(22) Filed: Jan. 14, 2022

(51) Int. Cl.
*H02M 7/217* (2006.01)
*H02M 7/04* (2006.01)
*H02M 3/335* (2006.01)
*H02M 1/00* (2006.01)
*H02M 7/00* (2006.01)

(52) U.S. Cl.
CPC ......... *H02M 7/217* (2013.01); *H02M 1/0095* (2021.05); *H02M 3/33515* (2013.01); *H02M 7/05* (2021.05); *H02M 7/003* (2013.01)

(58) Field of Classification Search
CPC ...... H02M 7/217; H02M 7/05; H02M 1/0095; H02M 3/33515; H02M 7/003
See application file for complete search history.

(56) References Cited

U.S. PATENT DOCUMENTS

| 10,651,753 | B1* | 5/2020 | Khamesra | H02M 7/06 |
| 10,756,644 | B1* | 8/2020 | Shah | H02M 3/07 |
| 10,862,399 | B1* | 12/2020 | Rai | H02M 3/33515 |
| 10,910,954 | B1* | 2/2021 | Shah | H01R 24/60 |

OTHER PUBLICATIONS

"UCC24630 Synchronous Rectifier Controller With Ultra-Low-Standby Current" Texas Instruments, Mar. 2015, pp. 1-41; 41 pages.
Diodes Incorporated, "Secondary Side Synchronous Rectification Controller", DS38999 Rev. 6-2 APR346, May 2018; 12 pages.

* cited by examiner

*Primary Examiner* — Adolf D Berhane

(57) ABSTRACT

A secondary side controller of a flyback AC-DC converter includes an integrated circuit, which includes: an analog-to-digital converter (ADC) coupled to a voltage bus (VBUS), the ADC to output a digital value corresponding to a voltage level of the VBUS; first logic configured to generate a reference voltage based on the digital value; second logic configured to generate a VBUS gain value based on output power of a flyback transformer of the flyback AC-DC converter; an integrator to accumulate current corresponding to a sensed voltage at a drain of a synchronous rectifier (SR) of a secondary side of the flyback transformer, the accumulated current to be modified according to the VBUS gain value, wherein the integrator outputs an updated sensed voltage; and a comparator to output a detection signal, indicative of a negative sense voltage, in response to the updated sensed voltage matching the reference voltage.

21 Claims, 8 Drawing Sheets

EFFICIENT NEGATIVE-SENSE DETECTION OF SYNCHRONOUS RECITIFER IN VOLTAGE CONVERTER

TECHNICAL FIELD

This disclosure relates to integrated circuits (ICs) that control Universal Serial Bus (USB) power delivery to electronic devices.

BACKGROUND

Alternating current-to-direct current (AC-DC) converters convert power from an AC source to a DC at a specified voltage level. Generally, an AC-DC converter transfers power from an AC input coupled to a primary side of a transformer to a DC output coupled to a secondary side of the transformer. Some AC-DC converters operate in Discontinuous Conduction Mode (DCM). In a DCM mode, a converter stores power in its transformer during an on-cycle of the primary (e.g., AC) side, while the secondary (e.g., DC) side is off; the converter transfers the stored power during the following on-cycle of the secondary side, while the primary side is off.

A problem for converters operating in DCM mode is false negative sense (NSN) detection. False NSN detection happens when resonant ringing on the primary side of the converter is wrongly interpreted by the secondary side controller as a signal to turn on the secondary power switch field-effect transistor (PS-FET) to transfer of power to the secondary side. However, if the secondary side is turned on while the primary side is still on, then cross-conduction may cause very high secondary-side current that can cause breakdown of secondary-side transistors and diodes. Conventionally, blanking time (e.g., blanking NSN detection for a certain time interval or based on other triggers) may be used as a solution to this problem. Blanking time, however, may not solve the problem completely and decreases the efficiency of the converter due to unnecessary and untimely turn-on of the secondary side since power would be transferred through the rectifier diode instead of the secondary PS-FET during such blanking time thereby causing power loss.

DETAILED DESCRIPTION

Figure 1:
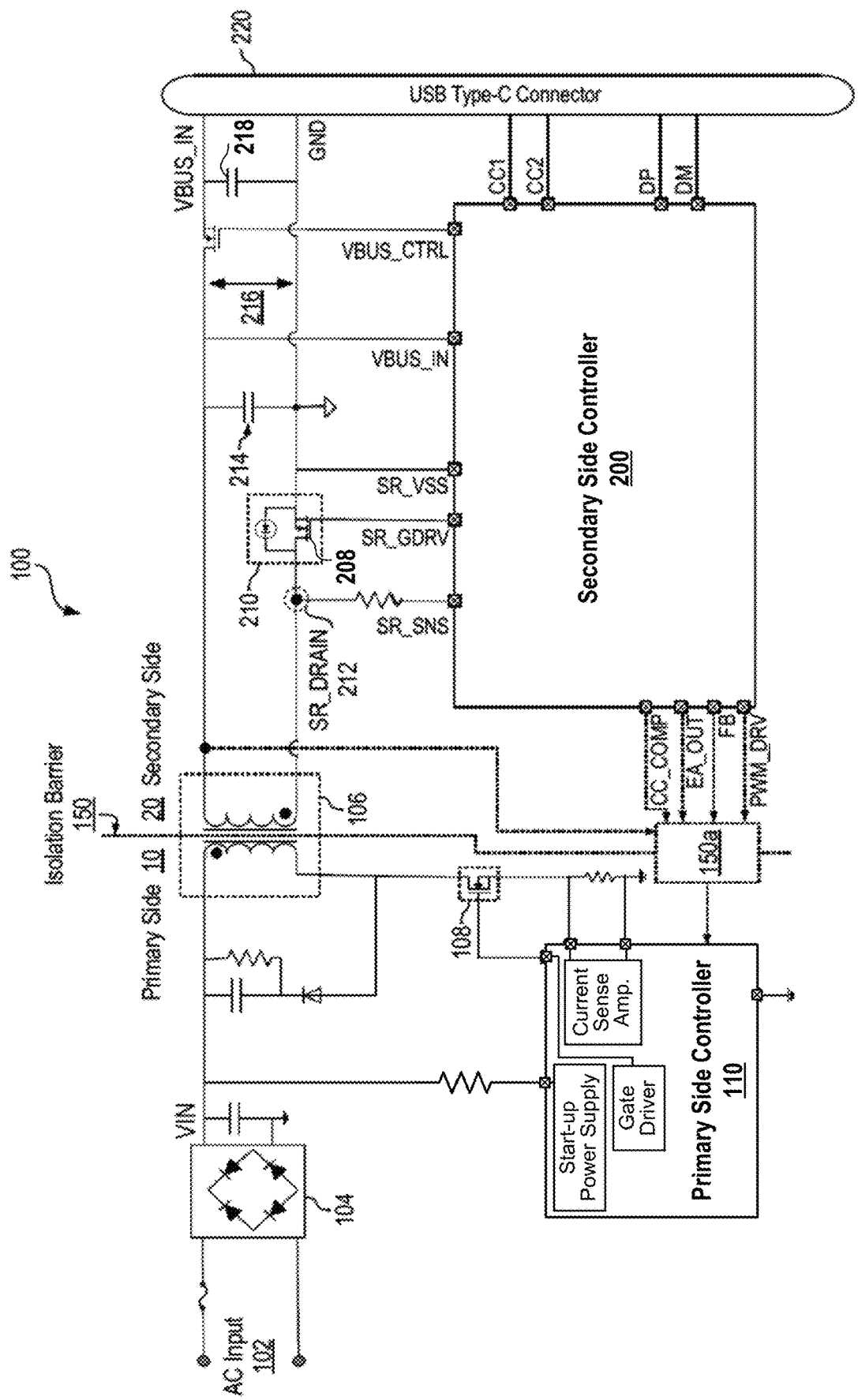
FIG. 1 is a schematic of a primary-controlled AC-DC converter system according to with an example embodiment.

The following description sets forth numerous specific details such as examples of specific systems, components, methods, and so forth, in order to provide a good understanding of various embodiments of a flyback AC-DC converter for USB Type-C controllers described herein. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of an flyback AC-DC converter in Universal Serial Bus (USB) Type-C controllers that can be disposed to operate in various electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., cables, hubs, docking stations, adapters, chargers, etc.), audio/video/data recording and/or playback devices (e.g., cameras, voice recorders, hand-held scanners, monitors, etc.), and other similar electronic devices that can use USB interfaces for communication, battery charging, and/or power delivery.

A more recent technology for USB connectors, called USB Type-C (also referred to herein as "USB-C"), is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc.

In some embodiments, AC-DC converters with secondary side control and synchronous rectifier (SR) architecture including a single SR-sense pin (SR_SEN) and methods of operating the same are disclosed for reducing the cost, complexity, and size of the converter while improving efficiency. The system and methods of the present disclosure are particularly useful in or with flyback AC-DC converters to improve efficiency and accuracy of true NSN detection of the SR drain voltage of the flyback AC-DC converter.

FIG. 1 is a primary-controlled AC-DC converter 100, in accordance with some embodiments, which can also be referred to as a flyback converter system. The AC-DC converter 100 is a flyback AC-DC converter that provides galvanic isolation between the AC input 102 and the DC output 216. AC-DC converter 100 includes a primary side 10 disposed on the AC input side of a flyback transformer 106, and a secondary side 20 disposed on the DC output side of the flyback transformer 106. An isolation barrier 150, with isolation element 150a, electrically isolates the primary side 10 from the secondary side 20. In primary-controlled mode, the primary side 10 of the flyback transformer 106 controls the operation of the AC-DC converter 100 since the only communication channel from the primary side 10 to the secondary side 20 is the voltage level provided by the flyback transformer 106 to the secondary side 20. The on-cycles of the primary side 10 and secondary side 20 are typically separated by a time interval during which the power stored in the flyback transformer 106 is transferred through the rectifier diode, which causes higher power loss and thereby reduces the efficiency.

Referring to FIG. 1, the primary side 10 of AC-DC converter 100 includes an AC input 102, a bridge rectifier 104, the flyback transformer 106, a primary power switch (PS) field-effect transistor (FET) 108, and a primary side controller 110. Further, the secondary side 20 includes a secondary side controller 200, a synchronous rectifier (SR) circuit 210 (e.g., an "SR"), a drain node (SR_DRAIN) 212, an output capacitor 214, and a Universal Serial Bus (USB) Type-C connector 220.

In various embodiments, on the primary side 10, the AC input 102 is configured to receive alternating current from a power source, e.g., such as a wall socket (not shown). The bridge rectifier 104 is coupled between an AC input 102 and the flyback transformer 106 to rectify the input voltage received at the AC input 102. The flyback transformer 106 is coupled to conduct the AC current from bridge rectifier 104, through its primary coil and the primary PS-FET 108, to ground. An input capacitor can be coupled to the output of the bridge rectifier 104 to be charged to an input voltage (Vin) into the primary side 10 of the AC-DC converter 100. In these embodiments, the primary side controller 110 is coupled to the gate of the primary PS-FET 108 to control the on and off cycles of flyback transformer 106.

In at least some embodiments, on the secondary side 20, the SR circuit 210 is coupled between the secondary coil of flyback transformer 106 and the output capacitor 214. The SR circuit 210 (also referred to herein as the "SR") includes a secondary PS-FET 208 coupled in parallel to a diode, such that when the secondary PS-FET 208 is turned on, induction current flows to drain node 212. The SR circuit 210 is configured to charge the output capacitor 214 (in successive on and off cycles), so that the output capacitor 214 can provide a steady voltage to the DC output 216. The DC output 216 is coupled to the power connector 220. In these embodiments, the secondary side controller 200 is coupled to the drain node 212 of the SR circuit 210 to sense the voltage (and changes thereof) on the drain node. The secondary side controller 200 is also coupled to the gate of the secondary PS-FET 208 in the SR circuit 210 to turn the SR circuit 210 on and off (e.g., in respective on and off cycles) based on voltage peaks, negative voltage, and zero-voltage crossings sensed on the drain node 212.

In at least some embodiments, a feature that determines the efficiency of an AC-DC converter (e.g., such as the AC-DC converter 100) is the operation of the secondary PS-FET switch (e.g., the secondary PS-FET 208) that controls the operation cycles of the SR circuit (e.g., SR circuit 210). In primary-controlled mode, the secondary side controller (e.g., controller 200) is completely dependent on the voltage level of the drain node (e.g., SR_DRAIN 212) of the SR circuit 210 since there is no other communication channel from the primary side 10 to the secondary side 20. In a typical operating scenario, the voltage on the SR_DRAIN node goes below −0.2V to indicate to the secondary side controller 200 to turn on the secondary PS-FET 208. When the voltage on the SR_DRAIN node reaches back to 0V, the secondary side controller 200 detects this zero-voltage crossing and turns off the secondary PS-FET 208.

False NSN detection can be a problem for the secondary side controller 200 operating in the context of a primary-controlled AC-DC converter such as the AC-DC converter 100. Such false NSN detection happens during resonant ringing when the AC-DC converter 100 is operating in Discontinuous Conduction Mode (DCM). During such resonant ringing, the voltage on the SR_DRAIN node of the SR circuit 210 can get below −200 mV. This voltage can be wrongly interpreted by the secondary side controller 200 as a valid NSN detection event, causing the secondary side controller 200 to turn on the secondary PS-FET 208 of the SR circuit 210. This, in turn, results in efficiency loss due to the unnecessary turning on of the SR circuit 210, thereby discharging an output load capacitor 218, which carries the VBUS voltage (e.g., VBUS_IN) to ground. In addition, if the primary side controller 110 turns on the primary PS-FET 108 at the same time, then cross-conduction will result with both the primary side 10 and the secondary side 20 being on at the same time. Such cross-conduction, however, can result in very high secondary-side current, which can cause breakdown of the diode and transistor components of the SR circuit 210. In some flyback AC-DC converters, blanking time may be used as a solution to this problem (e.g., blanking NSN detection for a certain time interval). Use of such blanking time, however, decreases the efficiency of the AC-DC converter 100 because the secondary PS-FET 208 will not be turned on during this time and the diode of the SR circuit 210 will carry the peak current thereby causing power loss.

Figure 2:
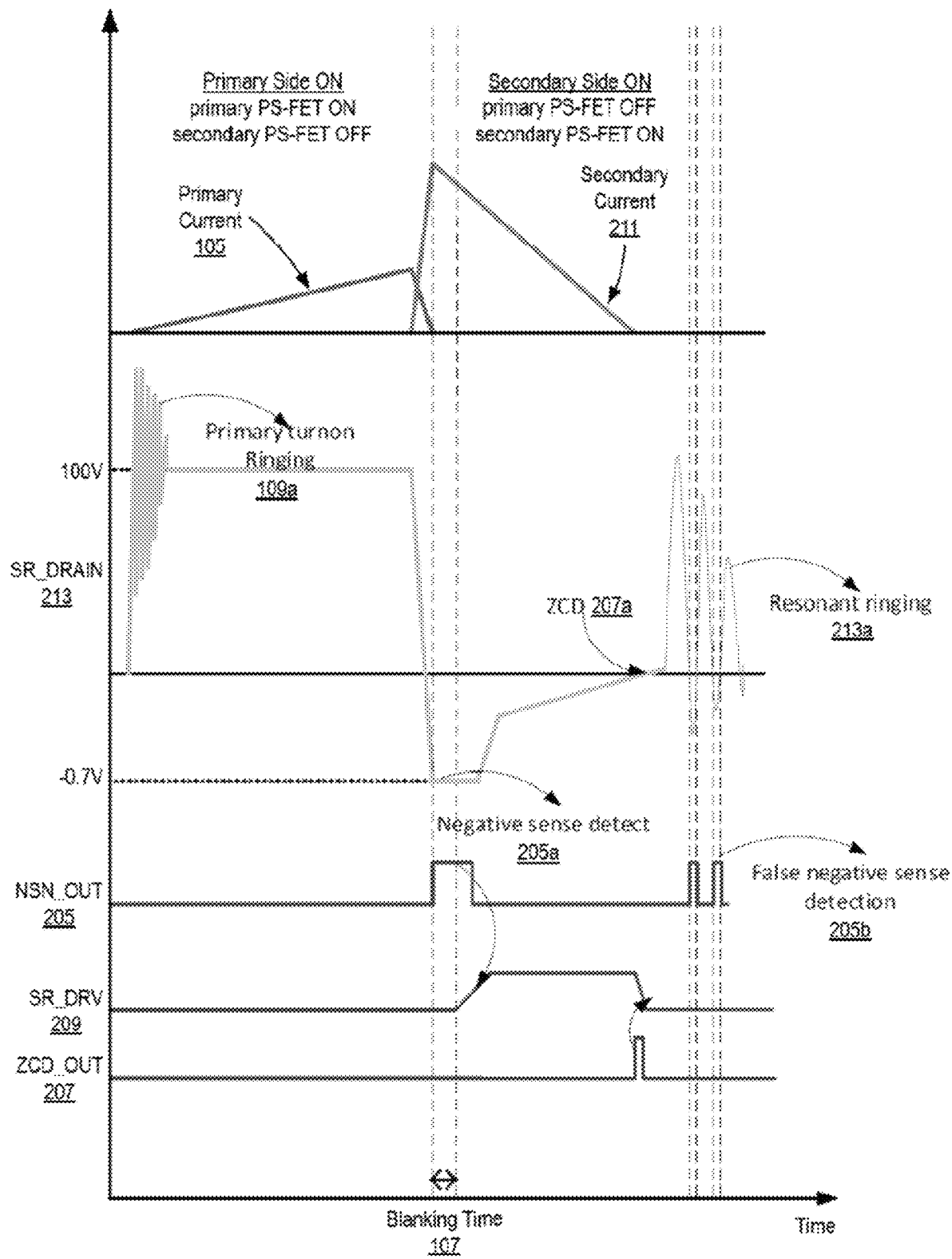
FIG. 2 is a signal flow diagram for a primary-controlled AC-DC converter system according to an embodiment.

FIG. 2 is an example signal diagram (e.g., for the primary-controlled AC-DC converter 100 operating in DCM mode) that illustrates the false NSN detection problem. When the primary side 10 is on (primary on-cycle), the primary PS-FET 108 is on, the secondary PS-FET 208 is off, and primary current 105 flows through the primary coil of the flyback transformer 106. When the secondary side 20 is on (secondary on-cycle), the primary PS-FET 108 is off, the secondary PS-FET 208 is on, and secondary current 211 flows to the drain node of the SR circuit. As illustrated in FIG. 2, the primary on-cycle and the secondary on-cycle are separated by blanking time interval 107 in a conventional manner.

When the primary side is turned on, a leakage ringing event 109a is effectuated on the SR_DRAIN signal 213. When the voltage on the SR_DRAIN signal 213 drops to approximately −0.7V, a true NSN event 205a can be detected based on the output NSN signal (NSN_OUT) 205 at the end of the blanking time interval 107. After the blanking time interval 107, the primary side 10 is turned off and the secondary side 20 is turned on. The detection of the true NSN event 205a is used to drive high the control signal SR_DRV 209, which turns on the secondary PS-FET 208. As a result, the voltage on the SR-DRAIN signal rises and eventually crosses 0V. When this happens, a zero-crossing detection (ZCD) event 207a can be detected based on the control signal ZCD_OUT 207, and the control signal SR_DRV 209 is driven low to turn off the secondary PS-FET 208. However, after ZCD event 207a, the voltage on the SR_DRAIN signal 209 continues to rise and effectuates resonant ringing 213a thereon. This causes a false NSN detection event 205b to be detected on the SR_DRAIN signal 213 based on the NSN_OUT signal 205. The detection of this (false) NSN event 205b is used to drive the control signal SR_DRV 209 high, which unnecessarily (i.e., faultily) turns on the secondary PS-FET 208.

In order to prevent such faulty turn-on of the secondary PS-FET 208, the architecture described herein provides for detecting the real, true turn-on event of the primary side 10 and to avoid false NSN detection. For example, the flyback converter architecture described herein employs a combination of a VBUS tracking reference scheme along with dynamic VBUS current compensation designed to detect false NSNs as well as optimize efficiency along VBUS and Vin of the AC-DC converter 100. As described below, a combination of analog and digital circuitry can be employed to efficiently and accurately detect true NSN events. Thus, the AC-DC converter 100 configured in accordance with the techniques described herein can distinguish between a real and a false NSN detection event.

Figure 3A:
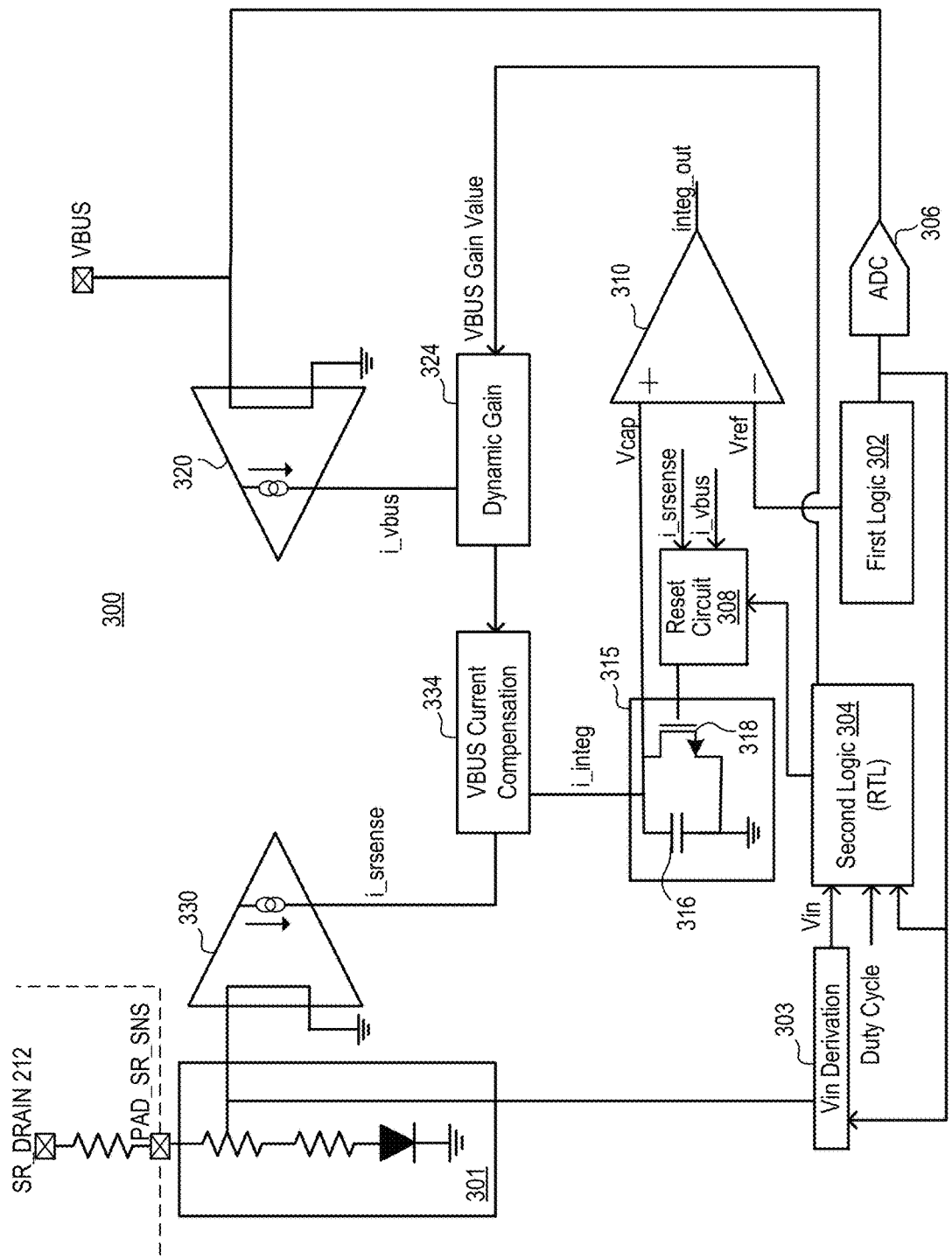
FIG. 3A is a schematic block diagram of a secondary side controller configured to efficiently, and correctly, detect NSN of the synchronous rectifier according to some embodiments.

FIG. 3A is a schematic block diagram of a secondary side controller 300 configured to efficiently, and correctly, detect NSN of the SR circuit 210 according to some embodiments. In one embodiment, the secondary side controller 300 is the secondary side controller 200 of FIG. 1. In some embodiments, the secondary side controller 300 is configured to control the flyback AC-DC converter 100 to provide a DC output compatible with a Universal Serial Bus Type C standard (USB-C). In various embodiments, the secondary side controller 300 includes a sensing block 301 that in turn includes a voltage divider connected in series with a diode connected. The voltage divider is connected to a sensing pad (PAD_SR_SNS) input of the secondary side controller 300 that is coupled with the SR_DRAIN 212 (FIG. 2). A tap point of the voltage divider can produce a sensed voltage corresponding to the voltage level of the SR_DRAIN 212 of the SR circuit 210.

In illustrated embodiments, the secondary side controller 300 further includes first logic 302, a Vin derivation block 303, second logic 304, an analog-to-digital converter (ADC) 306, a reset circuit 308, a comparator 310, an integrator 315, a first voltage-to-current converter 320, a dynamic gain circuit 324, a second voltage-to-current converter 330, and a VBUS current compensation circuit 334. In these embodiments, the ADC 306 is coupled to the voltage bus (VBUS), e.g., through the VBUS_IN pin, and is configured to output a digital value corresponding to a voltage level of the VBUS. The first logic 302 is coupled to the ADC 306 and is configured to generate a reference voltage (Vref) based on the digital value. The reference voltage is fed to the comparator 310 as the Vref of the comparator 310. In different embodiments, the second logic 302 is either firmware, hardware, or a combination thereof. Thus, the Vref is a digitally-controlled voltage reference that is programmable and adjustable in real time based on the VBUS voltage.

In these embodiments, the second logic 304 can be resistor transfer logic (RTL) (or other programmable logic) that generates a VBUS gain value based on the output power of the flyback transformer 106 of the AD-DC converter 100. In at least one embodiments, to determine the VBUS gain value, the second logic 304 operates on the input voltage (Vin) derived from the Vin derivation block 303 and on the duty cycle of the sensed voltage. The duty cycle can be determined as the percentage of time that the secondary PS_FET 208 is turned on. The Vin derivation block 303, which is coupled to the voltage divider of the sensing block 301, can be configured to determine the input voltage (Vin) value (see FIG. 1) based on a turns ratio (N) of the flyback transformer 106 and on the voltage level of the VBUS. More specifically, the value of Vin can be derived by subtracting, from the sensed voltage, a value for VBUS (which may correspond to the digital value from the ADC 306) and dividing by the turns ratio (N) of the flyback transformer 106. The turns ratio (or N) can be understood as the number of turns of the flyback transformer 106 on the primary side 10 compared to the number of turns of the flyback transformer 106 on the secondary side 20. By tracking the Vin value in generating the VBUS gain value, the percentage of the VBUS compensation, performed by the current compensation circuit 334 as discussed below, can be more efficiently controlled.

In at least some embodiments, the integrator 315 is configured to accumulate current corresponding to the sensed voltage at the drain (e.g., SR_DRAIN 212) of the synchronous rectifier (SR) of the secondary side 20 of the flyback transformer 106. The accumulated current is to be modified according to the VBUS gain value, as will be explained in more detail. The integrator 315 outputs an updated sensed voltage (Vcap) based on the modifications that is also fed to the comparator 310. In these embodiments, the comparator 310 is configured to output a detection signal (integ_out), indicative of a negative sense (NSN) voltage detection, in response to the updated sensed voltage matching the reference voltage (Vref) generated by the first logic 302. In this way, the first and second logic provide programmable references by which an updated sensed current is generated for more efficient and accurate VBUS tracking for purposes of NSN detection.

In various embodiments, the first voltage-to-current converter 320 is configured to convert the voltage level of the VBUS to a VBUS current on which the dynamic gain circuit 324 can operate. Further, the second voltage-to-current converter 330 is configured to convert the sensed voltage (from the tap point of the sensing block 301) to a sensed current. The current compensation circuit 334 is coupled between the first voltage-to-current converter 320, the second voltage-to-current converter 330, and the integrator 315 and is configured to provide a compensated sensed current (i_integ) to the integrator 215 to modify the accumulated current based on a difference between the sensed current and a multiple of the VBUS current. In these embodiments, the dynamic gain circuit 324 is coupled to the current compensation circuit 334 and to the first voltage-to-current converter 320 and is configured to generate, for the current compensation circuit 334, the multiple of the VBUS current based on the VBUS gain value, which will be discussed in more detail with reference to FIG. 4A.

In at least some embodiments, the integrator 315 is coupled to the first voltage-to-current converter 330, e.g., via the VBUS current compensation circuit 334. In some embodiments, the integrator 315 includes a capacitor 316, a bypass transistor 318 coupled in parallel to the capacitor 316, and an inverter 409 (see FIG. 4A) coupled between the second voltage-to-current converter 330 and the bypass transistor 318. In these embodiments, the reset circuit 308 can include reset circuitry that detects whether the sensed current (i_srsense) exceeds a VBUS-based reset current level for purposes of triggering the inverter 409 to turn on the bypass transistor 318 so that the capacitor 316 can be charged. The second logic 304 is further configured to generate a control signal that sets the VBUS-based reset current level as will be discussed in more detail with reference to FIG. 4A by way of one implementation.

In various embodiments, the second logic 304 is also configured to enable level-based sensing of the sensed voltage that bypasses the integrator 315 for lower turns ratios (N) of the transformer 106, e.g., a turns ratio below a threshold value. In these embodiments, the second logic 304 causes the control signal going to the reset circuit 308 to keep the bypass transistor 318 turned on and instead supply the sensed voltage from the sensing block 301 to the comparator 310, e.g., in lieu of Vcap. Instead employing level-based sensing makes sense in these low-N embodiments, as LC ringing levels on the secondary side 20 of the flyback transformer 106 are expected to be lower than the SR_DRAIN voltage level when the primary PS_FET 108 is turned on. This helps to enable the secondary PS_FET 208 even for low-load scenarios and improves efficiency.

Figure 3B:
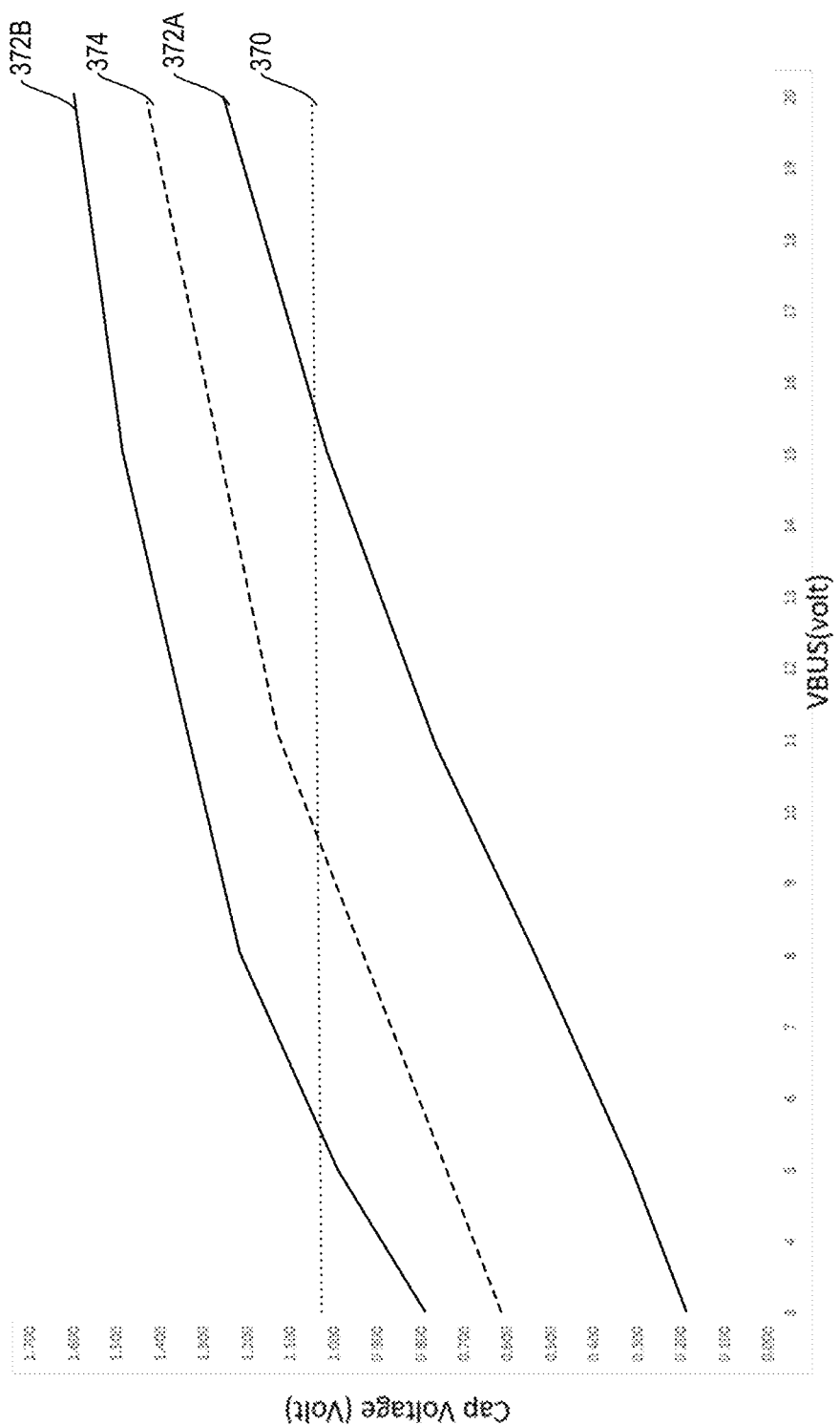
FIG. 3B is a graph of capacitance voltage (Vcap) versus VBUS voltage depending on approach for tracking the VBUS voltage according to some embodiments.

FIG. 3B is a graph of capacitance voltage (Vcap) versus VBUS voltage depending on approach for tracking the VBUS voltage according to some embodiments. The Vcap, for example, is the voltage provided by the capacitor 316 to the comparator 310, when charged. For purposes of comparison, a first waveform 370 illustrates conventional NSN detection with a fixed Vref value, thus when no VBUS-based tracking if performed. A second waveform 372A illustrates a maximum area under the resonant ringing curve, 213a (FIG. 2), when integrated. A third waveform 372B illustrates a minimum area under the SR_DRAIN 212 curve, when the primary PS_FET 108 is turned on, e.g., at the beginning of the SR_DRAIN signal 213 illustrated in FIG. 2. In the middle of the second and third waveforms is a fourth waveform 374, which illustrates the Vcap value changing in association with dynamically-changing Vref, as was explained with reference to FIG. 3A, based on the VBUS voltage level. Thus, as can be observed, the fourth waveform 374 generated by the disclosed architecture and techniques tracks below the actual SR_DRAIN curve of the third waveform 372B, thereby avoiding false NSN detection by programmably-tracking the VBUS voltage level.

With additional reference to the integrator 315 of FIG. 3A, the VBUS integration level is altered with Vin (e.g., in generating the VBUS gain value) such that accurately tracks a lower threshold (e.g., 110% of VBUS) at lower Vin and a higher threshold at higher Vin, as this increases integrating the SR_DRAIN area more compared to the ringing area. This allows the secondary side controller 300 to not bypass real NSN events even at lower Vin voltages. In addition, for low-load condition on the secondary side 20, for a feature of "Zero Voltage Switching (ZVS) on Nth Valley," the LC (or resonant) oscillation dies down and the SR_DRAIN voltage stays at the VBUS voltage. With a programmable threshold of 120% of VBUS above which sensing for true NSN events can be performed, the secondary PS_FET 208 would remain off during ZVS on the Nth valley and would avoid cross-conduction. Adjusting the VBUS gain value as described above can efficiently set this programmable threshold.

Figure 4A:
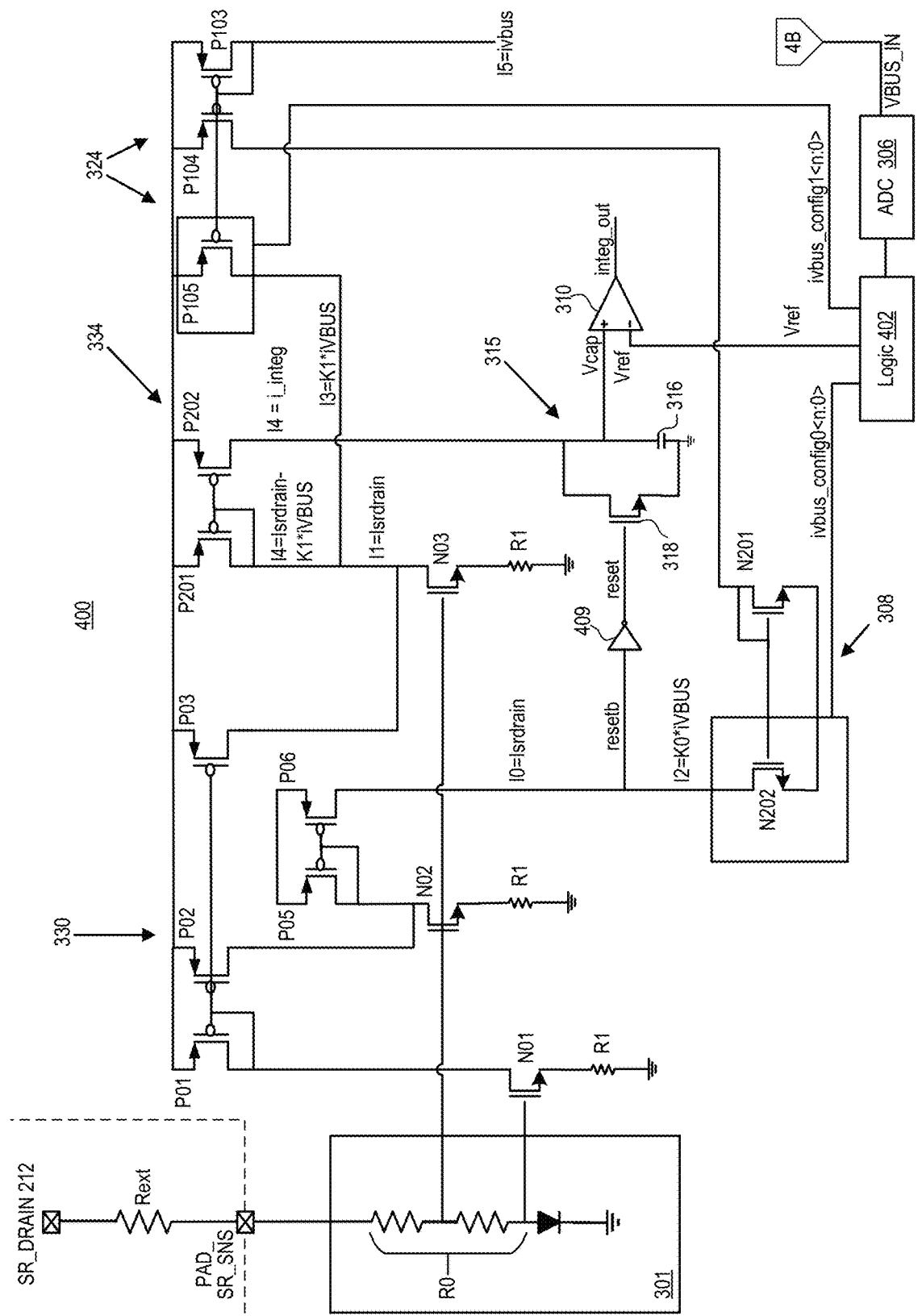
FIGS. 4A-4B are a schematic diagram of a secondary side controller configured to efficiently, and correctly, detect NSN of the synchronous rectifier according to some embodiments.
Figure 4B:
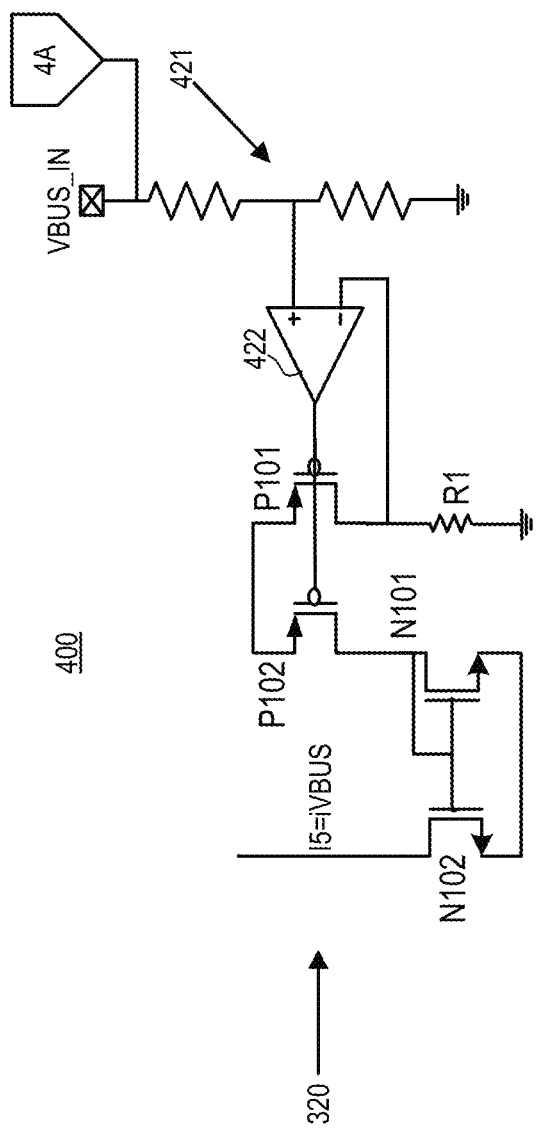

FIGS. 4A-4B are a schematic diagram of a secondary side controller 400 configured to efficiently, and correctly, detect NSN of the synchronous rectifier according to some embodiments. In at least some embodiments, the secondary side controller 400 is representative of an example implementation of the secondary side controller 300 of FIG. 3A, and thus implementing components are labeled identically to corresponding components illustrated in FIG. 3A. In this implementation, the first and second logic 302 and 304 as well as the Vin derivation block 303 are grouped together as logic 402 in FIG. 4A for simplicity, but can be implemented as processing logic, firmware, RTL, hardware, or a combination thereof. This logic 402 is configured to generate multiple control signals or values discussed with reference to FIG. 3A.

According to various embodiments, the first voltage-to-current converter 320 can include the circuitry of FIG. 4B, including a voltage divider 421, a comparator 422, a pair of p-type transistors (P101, P102) gate-coupled to an output of the comparator 422, with a drain of the P101 transistor coupled to ground through an R1 resistor and the negative terminal of the comparator 422 also coupled to ground through the R1 resistor. A center output of the voltage divider 421 can be fed to the positive terminal of the comparator 422. The sources of the transistors P101 and P102 are coupled together and the drain of the P102 transistor feeds a current mirror that includes a pair of n-type transistors (N101, N102), where the N102 transistor outputs the current of the VBUS, e.g., I5 or iVBUS. This iVBUS (or I5) then feeds another current mirror that includes another pair of p-type transistors (P103, P104) illustrated in FIG. 4A. Further, the VBUS voltage from the VBUS_IN pad is supplied to the ADC 306 of FIG. 4A.

According to illustrated embodiments, the voltage divider of the sensing block 301 of FIG. 3A is part of a voltage divider that includes an external resistor (Rext) coupled between the SR sensing pad (PAD_SR_SNS) and the SR_DRAIN 212. The resistor that is within the sensing block 301 can be a variable second resistor, which is labeled as an "R0" resistor. A pair of tapped locations off of the R0 resistor (one of which is above the diode of the sensing block) can provide the sensed voltage previously discussed.

In various embodiments, the second voltage-to-current converter 330 includes a first n-type transistor N01 with a gate driven by the bottom tap point of the R0 resistor and a second n-type transistor N02 with a gate driven by the top tap point of the R0 resistor. An R1 resistor is supplied between the sources and ground of each of the N01 and N02 transistors. Further, in these embodiments, the second voltage-to-current converter 330 includes a first current mirror of a first pair of p-type transistors P01 and P02 that share current through the N01 transistor and a second current mirror of a second pair of p-type transistors P05 and P06 that share current through the N02 transistor. Drains of the P02 and P05 transistors are interconnected so that the output of transistor P06 includes the SR drain-converter current (Isrdrain), also referred to as I0. By way of this arrangement, the Isrdrain current can be expressed as $i_{SRDRAIN}$=VIN/N*R0/ 10*(Rext+R0)*1/R1.

In at least some embodiments, a further p-type transistor P03 is coupled between the first current mirror of the second voltage-to-current converter 330 and a third n-type transistor N03, which also mirrors the Isrdrain current to the drain of the N03 transistor. Another R1 resistor is also connected between a source of the N03 transistor and ground.

In the illustrated embodiments, the VBUS current compensation circuit 334 includes a current mirror that includes a pair of p-type transistors P201 and P202, with an input to the P201 transistor being the Isrdrain (I1) current. Accordingly, in one embodiment, the N03 transistor and the R1 resistor are considered a part of the VBUS current compensation circuit 334. A drain of the P201 transistor is coupled with a line for the dynamic gain compensation circuit carrying a current I3, which will be discussed in more detail below. Thus, the input of the current mirror that includes the P201 and P202 transistors subtracts the I3 current from the I1, or Isrdrain, current to generate an I4 current. Because the I4 current is mirrored to the output of the current mirror, the I4 current is the compensated sensed current (i_integ) that is supplied to the integrator 315, e.g., to modify the accumulated current on the capacitor 316.

In these embodiments, the dynamic gain circuit 324 includes the P103 and P104 transistors that are mirrored with an array of p-type transistors P105 (functioning as a current digital-to-analog converter (IDAC)), where each selected p-type transistor supplies a multiple of the mirrored iVBUS current from the P104 transistor. Accordingly, the VBUS gain value (labeled as ivbus_config1<n:0>), which can be a digital multiplier, is configured to selectively connect one or more of the p-type transistors of the array of p-type transistors P105 in a current mirror with the current compensation circuit 334, e.g., which supplies the I3 current as K1*iVBUS, where the K1 value represents the digital multiplier provided by the logic 402. Other implementations are envisioned for selectively increasing the I3 current according to the VBUS gain value.

In the various illustrated embodiments, as previously discussed with reference to the second logic 304, the logic 402 is also configured to generate a control signal (labeled as ivbus_configure0<n:0>) that sets a VBUS-based reset current level which, if exceeded by the sensed current (here, Isrdrain), triggers the inverter 409 to turn off the bypass transistor 318, causing the capacitor 316 to be charged. In these embodiments, this control signal can be a second digital multiplier to multiply the iVBUS current that passes through the reset circuit 308.

Thus, in these embodiments, the reset circuit 308 includes a reset current mirror that includes a first n-type transistor 201 coupled to and carrying the VBUS current (iVBUS) from the first voltage-to-current converter 330. This reset current mirror can further include an array of n-type transistors N202 (also functioning as an IDAC), wherein the second digital multiplier is configured to selectively connect one or more of the n-type transistors N202 within the reset current mirror and that are coupled to the first voltage-to-current converter 320 and the inverter 409. In this way, the iVBUS is mirrored and then multiplied through the N202 array of n-type transistors to generate an I2 current of K0*iVBUS, where the K0 value is the second multiplier value. If the I0 (e.g., Isrdrain) current exceeds the I2 current, the resetb signal is asserted and the reset signal is deasserted, which causes the transistor 318 to be turned off, allowing the capacitor 316 to be charged. By charging the capacitor 316, the comparator 310 is activated to be able to detect an NSN event at its output (intg_out).

In this way, the capacitor 316 charge is equivalent to a voltage-time product, performing the integration of the voltage corresponding to the compensated sensed current (i_integ). Further, the output power of the capacitor 316 corresponding to Vcap can be tracked by a programmable reference voltage (Vref) generated by the logic 402 based on the digital value generated by the ADC 306 from the VBUS voltage.

Figure 5:
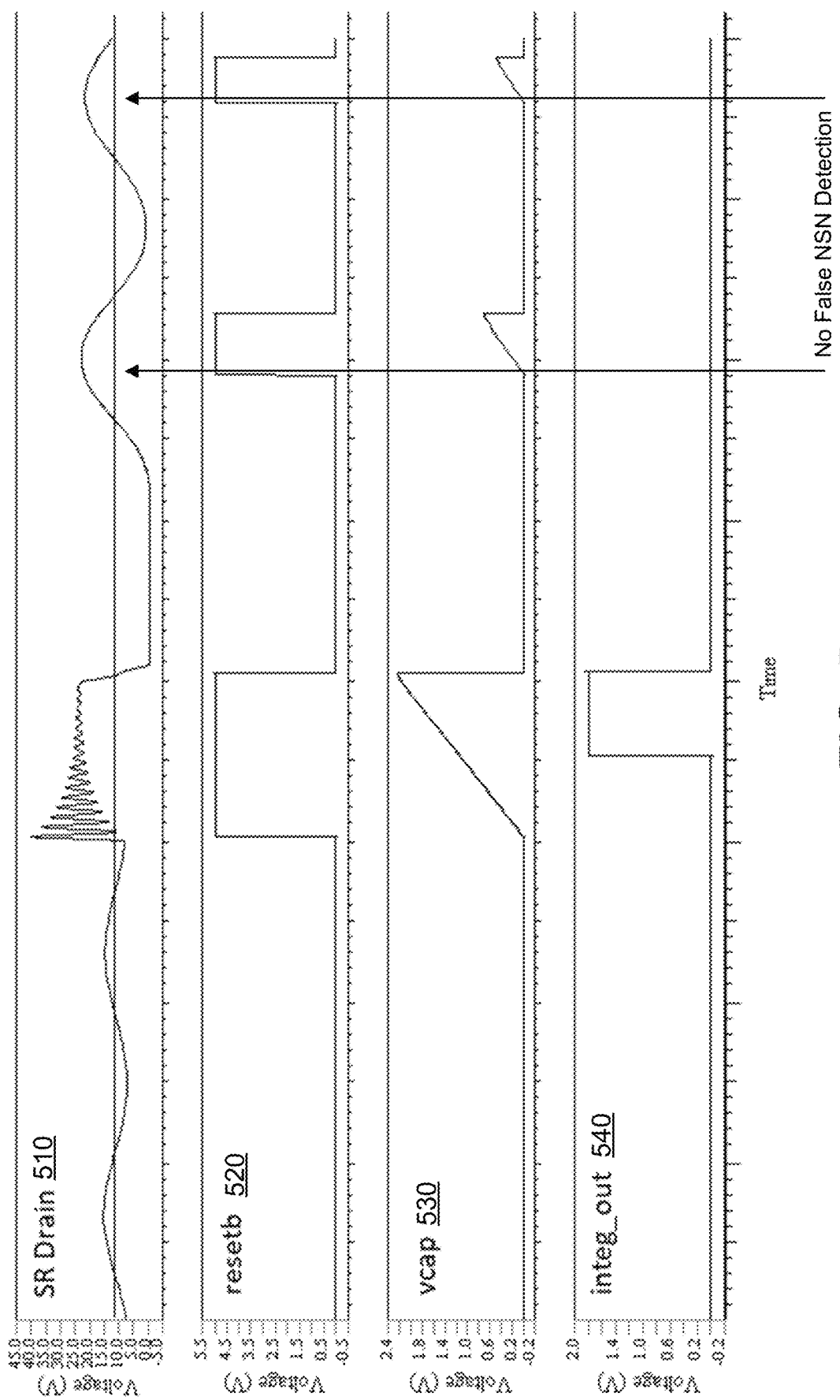
FIG. 5 is a signal flow diagram associated with schematic diagram of FIGS. 4A-4B according to at least one embodiment.

FIG. 5 is a signal flow diagram associated with schematic diagram of FIGS. 4A-4B according to at least one embodiment. The waveforms in this signal flow diagram include an SR_DRAIN signal 510, a resetb signal 520, a Vcap signal 530, and an integ_out signal 540. The SR_DRAIN signal 510 illustrates a resonant ringing of the voltage at the output of the flyback converter 106, corresponding to the SR_DRAIN 212 of the SR circuit 210. The resetb signal 520 illustrates the current signal "resetb" in FIG. 4A. The Vcap signal 530 illustrates the integration of the current onto the capacitor 316 of the integrator 215, which is triggered in order to detect an NSN event. The integ_out signal 540 illustrates the pulsed output of a true NSN event, where even when the resetb signal 520 is asserted, the charge on the capacitor 316 is insufficient to trip the output of the integ_out signal 540, thereby avoiding false NSN signals.

The present embodiments include various advantages that improve over previous implementations, at least some of which are flexibility, efficiency and performance, reliability, being ZVS ready, and there is no additional pin or external component to the secondary side controller 200 to implement, so cost savings. The flexibility is due to using a turns ratio (N), the logic 402 can choose between either level-based sensing or voltage-second-based scheme for detecting true NSN events. The efficiency comes from the programmable reference voltage (Vref) being based on the VBUS and/or Vin values, enabling the secondary PS_FET 208 to be on even for low power loads. The integration cycle is optimized based on converter output voltage sensing through firmware and/or hardware and setting the proper voltage reference (Vref) for improved efficiency. Performance and efficiency are improved by ensuring that the SR gate driver is not turned on during LC (or resonant) ringing. Further, the dynamic VBUS current compensation (100% to 150% or more of VBUS) improves efficiency at both low voltage output as well as higher voltage outputs. The present embodiments are ZNS ready due to being able to keep the secondary PS_FET 208 off even for the ZVS on any Nth valley.

Figure 6:
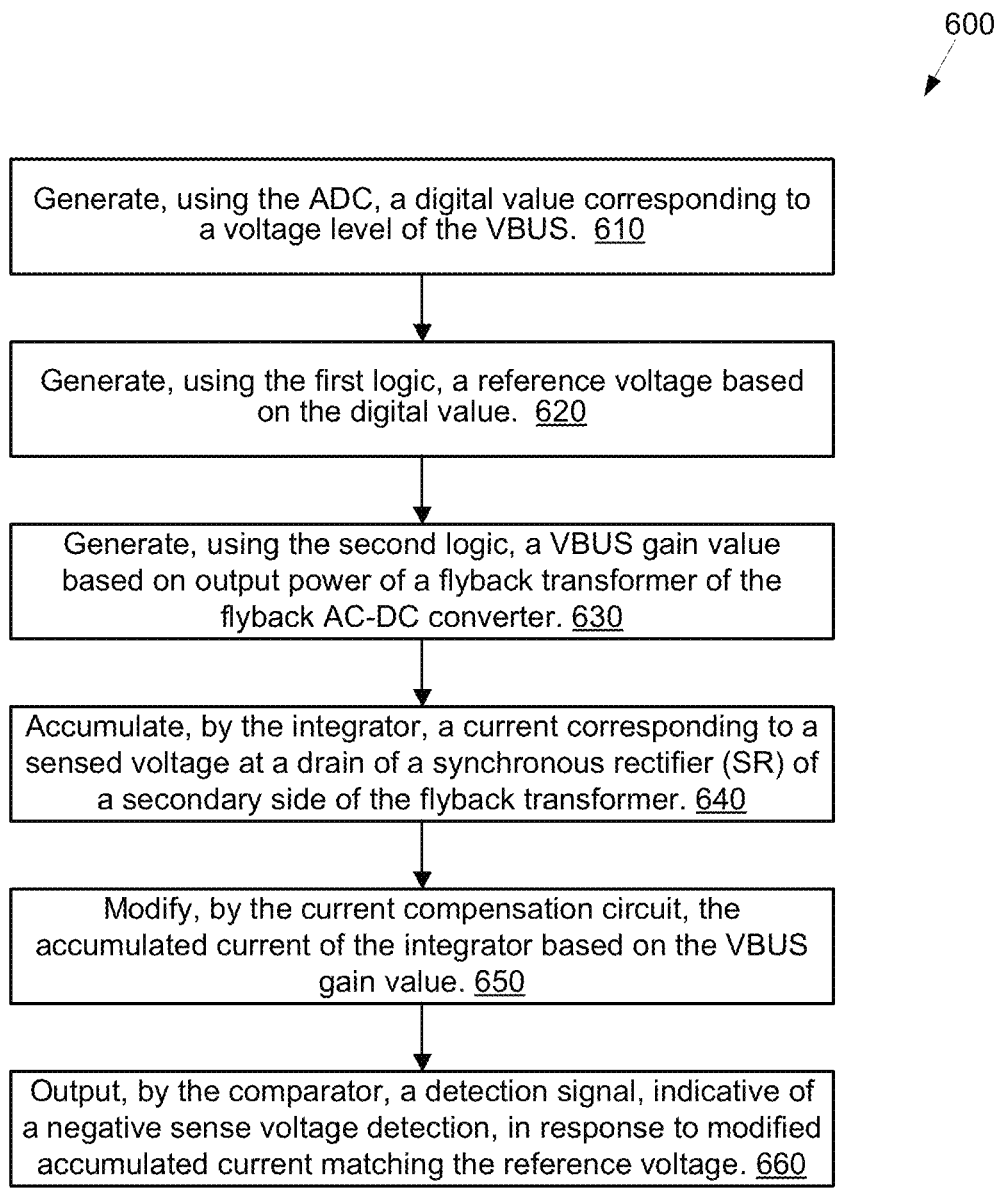
FIG. 6 is a flow diagram of a method of operating a secondary side controller for a flyback AC-DC converter according to at least one embodiment.

FIG. 6 is a flow diagram of a method 600 of operating a secondary side controller for an flyback AC-DC converter according to at least one embodiment. In these embodiments, the method 600 is performed by the AC-DC converter 100 that employs the secondary side controller 200 or 300, which are illustrated and discussed with reference to FIGS. 1-5. In particular, the method 600 can employ firmware, logic, and circuit components of the secondary side controller 200 or 300, which were discussed previously.

At operation 610, the method 600 includes generating, using the ADC 306, a digital value corresponding to a voltage level of the VBUS.

At operation 620, the method 600 includes generating, using the first logic 302, a reference voltage (Vref) based on the digital value.

At operation 630, the method 600 includes generating, using the second logic 304, a VBUS gain value based on output power of the flyback transformer 106 of the flyback AC-DC converter.

At operation 640, the method 600 includes accumulating, by the integrator 315, a current corresponding to a sensed voltage at a drain of a synchronous rectifier (SR) of the secondary side 20 of the flyback transformer 106.

At operation 650, the method 600 includes modifying, by the current compensation circuit 334, the accumulated current of the integrator 315 based on the VBUS gain value.

At operation 660, the method 600 includes outputting, by the comparator 310, a detection signal, indicative of a negative sense voltage detection, in response to the modified accumulated current (i_integ) matching the reference voltage (Vref).

In these embodiments, the method 600 can further include determining, by the second logic 304, the VBUS gain value based on a value derived for an input voltage (Vin) to the flyback transformer 106 and on a duty cycle of the sensed voltage, wherein the value derived for the input voltage is based on a turns ratio of the flyback transformer and the voltage level of the VBUS, and enabling, by the second logic 304 for a turns ratio below a threshold value, level-based sensing of the sensed voltage that bypasses the integrator 315.

In these embodiments, the method 600 can further include converting, by the second voltage-to-current converter 330, the sensed voltage to a sensed current, and generating, by the second logic 394, a control signal that sets a VBUS-based reset current level which, if exceeded by the sensed current, triggers the inverter 409 to turn off the bypass transistor, causing the capacitor to be charged.

Various embodiments of the efficient negative-sense detection of synchronous rectifier in voltage converter described herein may include various operations. These operations may be performed and/or controlled by hardware components, digital hardware and/or firmware, and/or combinations thereof. As used herein, the term "coupled to" may mean connected directly to or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A secondary side controller of a flyback alternating current-to-direct current (AC-DC) converter comprising an integrated circuit (IC) that comprises:
    an analog-to-digital converter (ADC) coupled to a voltage bus (VBUS), the ADC to output a digital value corresponding to a voltage level of the VBUS;
    first logic coupled to the ADC, the first logic configured to generate a reference voltage based on the digital value;
    second logic configured to generate a VBUS gain value based on output power of a flyback transformer of the flyback AC-DC converter;
    an integrator to accumulate current corresponding to a sensed voltage at a drain of a synchronous rectifier (SR) of a secondary side of the flyback transformer, the accumulated current to be modified according to the VBUS gain value, wherein the integrator outputs an updated sensed voltage; and
    a comparator to output a detection signal, indicative of a negative sense voltage detection, in response to the updated sensed voltage matching the reference voltage.

2. The secondary side controller of claim 1, wherein the second logic is configured to determine the VBUS gain value based on a value derived for an input voltage to the flyback transformer and on a duty cycle of the sensed voltage, and the value derived for the input voltage is based on a turns ratio of the flyback transformer and on the voltage level of the VBUS.

3. The secondary side controller of claim 2, wherein, for a turns ratio below a threshold value, the second logic is further configured to enable level-based sensing of the sensed voltage that bypasses the integrator.

4. The secondary side controller of claim 1, wherein the IC further comprises:
    a first voltage-to-current converter to convert the voltage level of the VBUS to a VBUS current;
    a second voltage-to-current converter to convert the sensed voltage to a sensed current; and
    a current compensation circuit coupled between the first voltage-to-current converter, the second voltage-to-current converter, and the integrator, the current compensation circuit to provide a compensated sensed current to the integrator to modify the accumulated current based on a difference between the sensed current and a multiple of the VBUS current.

5. The secondary side controller of claim 4, further comprising a dynamic gain circuit coupled to the current compensation circuit and to the first voltage-to-current converter, the dynamic gain circuit to generate, for the current compensation circuit, the multiple of the VBUS current based on the VBUS gain value.

6. The secondary side controller of claim 5, wherein the VBUS gain value is a digital multiplier, the dynamic gain circuit comprises an array of p-type transistors, and wherein the digital multiplier is to selectively connect one or more of the p-type transistors in a current mirror with the current compensation circuit.

7. The secondary side controller of claim 1, further comprising:
a first voltage-to-current converter to convert the sensed voltage to a sensed current; and
wherein the integrator is coupled to the first voltage-to-current converter and comprises:
a capacitor;
a bypass transistor coupled in parallel to the capacitor; and
an inverter coupled between the first voltage-to-current converter and the bypass transistor; and
wherein the second logic is configured to generate a control signal that sets a VBUS-based reset current level which, if exceeded by the sensed current, triggers the inverter to turn off the bypass transistor, causing the capacitor to be charged.

8. The secondary side controller of claim 7, wherein the control signal is a digital multiplier, further comprising:
a second voltage-to-current converter to convert the voltage level of the VBUS to a VBUS current; and
a reset current mirror comprising:
a first n-type transistor coupled to and carrying the VBUS current from the second voltage-to-current converter; and
an array of n-type transistors, wherein the digital multiplier is to selectively connect one or more of the n-type transistors within the reset current mirror and that are coupled to the first voltage-to-current converter and the inverter.

9. The secondary side controller of claim 1, configured to control the flyback AC-DC converter to provide a DC output compatible with a Universal Serial Bus Type C standard (USB-C).

10. A flyback converter system, the system comprising:
a flyback transformer;
a synchronous rectifier (SR) coupled to a secondary side of the flyback transformer; and
a secondary side controller coupled to the secondary side of the flyback transformer and the SR, the secondary side controller comprising:
an analog-to-digital converter (ADC) coupled to a voltage bus (VBUS), the ADC to output a digital value corresponding to a voltage level of the VBUS;
first logic coupled to the ADC, the first logic configured to generate a reference voltage based on the digital value;
second logic configured to generate a VBUS gain value based on output power of the flyback transformer;
an integrator to accumulate current corresponding to a sensed voltage at a drain of the SR, the accumulated current to be modified according to the VBUS gain value, wherein the integrator outputs an updated sensed voltage; and
a comparator to output a detection signal, indicative of a negative sense voltage detection, in response to the updated sensed voltage matching the reference voltage.

11. The system of claim 10, wherein the second logic is configured to determine the VBUS gain value based on a value derived for an input voltage to the flyback transformer and on a duty cycle of the sensed voltage, and the value derived for the input voltage is based on a turns ratio of the flyback transformer and on the voltage level of the VBUS.

12. The system of claim 11, wherein, for a turns ratio below a threshold value, the second logic is further configured to enable level-based sensing of the sensed voltage that bypasses the integrator.

13. The system of claim 10, wherein the secondary side controller further comprises:
a first voltage-to-current converter to convert the voltage level of the VBUS to a VBUS current;
a voltage divider including a first resistor coupled to the drain of the SR and a variable second resistor coupled to the first resistor;
a second voltage-to-current converter to convert the sensed voltage, from a tapped location of the variable second resistor, to a sensed current; and
a current compensation circuit coupled between the first voltage-to-current converter, the second voltage-to-current converter, and the integrator, the current compensation circuit to provide a compensated sensed current to the integrator to modify the accumulated current based on a difference between the sensed current and a multiple of the VBUS current.

14. The system of claim 13, wherein the secondary side controller further comprises a dynamic gain circuit coupled to the current compensation circuit and to the first voltage-to-current converter, the dynamic gain circuit to generate, for the current compensation circuit, the multiple of the VBUS current based on the VBUS gain value.

15. The system of claim 14, wherein the VBUS gain value is a digital multiplier, the dynamic gain circuit comprises an array of p-type transistors, and wherein the digital multiplier is to selectively connect one or more of the p-type transistors in a current mirror with the current compensation circuit.

16. The of claim 10, wherein the secondary side controller further comprises:
a first voltage-to-current converter to convert the sensed voltage to a sensed current; and
wherein the integrator is coupled to the first voltage-to-current converter and comprises:
a capacitor;
a bypass transistor coupled in parallel to the capacitor; and
an inverter coupled between the first voltage-to-current converter and the bypass transistor; and
wherein the second logic is configured to generate a control signal that sets a VBUS-based reset current level which, if exceeded by the sensed current, triggers the inverter to turn off the bypass transistor, causing the capacitor to be charged.

17. The system of claim 16, wherein the control signal is a digital multiplier, further comprising:
a second voltage-to-current converter to convert the voltage level of the VBUS to a VBUS current; and
a reset current mirror comprising:
a first n-type transistor coupled to and carrying the VBUS current from the second voltage-to-current converter; and
an array of n-type transistors, wherein the digital multiplier is to selectively connect one or more of the n-type transistors within the reset current mirror and that are coupled to the first voltage-to-current converter and the inverter.

18. The system of claim 10, further comprising an output capacitor coupled to a source of the SR, the output capacitor to provide a direct-current (DC) output compatible with a Universal Serial Bus Type C standard (USB-C).

19. A method of operating a secondary side controller for a flyback alternating current-to-direct current (AC-DC) converter that comprises an analog-to-digital converter (ADC) coupled to a voltage bus (VBUS), first logic, second logic, an integrator, a current compensation circuit, and a comparator, wherein the method comprises:

generating, using the ADC, a digital value corresponding to a voltage level of the VBUS;

generating, using the first logic, a reference voltage based on the digital value;

generating, using the second logic, a VBUS gain value based on output power of a flyback transformer of the flyback AC-DC converter;

accumulating, by the integrator, a current corresponding to a sensed voltage at a drain of a synchronous rectifier (SR) of a secondary side of the flyback transformer;

modifying, by the current compensation circuit, the accumulated current of the integrator based on the VBUS gain value; and outputting, by the comparator, a detection signal, indicative of a negative sense voltage detection, in response to the modified accumulated current matching the reference voltage.

20. The method of claim 19, further comprising:

determining, by the second logic, the VBUS gain value based on a value derived for an input voltage to the flyback transformer and on a duty cycle of the sensed voltage, wherein the value derived for the input voltage is based on a turns ratio of the flyback transformer and the voltage level of the VBUS; and enabling, by the second logic for a turns ratio below a threshold value, level-based sensing of the sensed voltage that bypasses the integrator.

21. The method of claim 19, wherein the secondary side controller further comprises a voltage-to-current converter, and wherein the integrator comprises a capacitor, a bypass transistor coupled in parallel to the capacitor, and an inverter coupled between the voltage-to-current converter and the bypass transistor, the method further comprising:

converting, by the voltage-to-current converter, the sensed voltage to a sensed current; and generating, by the second logic, a control signal that sets a VBUS-based reset current level which, if exceeded by the sensed current, triggers the inverter to turn off the bypass transistor, causing the capacitor to be charged.

* * * * *